United States Patent [19]

Blum et al.

[11] Patent Number: 5,922,806
[45] Date of Patent: Jul. 13, 1999

[54] AQUEOUS POLYURETHANE DISPERSIONS BASED ON 1-METHYL-2,4-AND/OR -2,6-DIISOCYANATOCYCLOHEXANE AND THEIR USE AS BINDERS FOR GLASS FIBER SIZINGS

[75] Inventors: Harald Blum, Wachtendonk; Karin Naujoks, Burscheid; Helmut Reiff, Leverkusen; Oswald Wilmes, Köln; Hans-Ulrich Meier-Westhues, Leverkusen, all of Germany; Raymond Audenaert, Hamme, Belgium

[73] Assignee: Bayer Aktiengesellschaft, Leverkusen, Germany

[21] Appl. No.: 08/811,802

[22] Filed: Mar. 6, 1997

[30] Foreign Application Priority Data

Mar. 26, 1996 [DE] Germany .................... 196 11 850

[51] Int. Cl.$^6$ .................... C08J 3/00; C08K 3/20; C08L 75/00
[52] U.S. Cl. .................... 524/591; 524/839; 524/840
[58] Field of Search .................... 524/591, 839, 524/840

[56] References Cited

U.S. PATENT DOCUMENTS

| 3,479,310 | 11/1969 | Dieterich et al. | 260/29.2 |
|---|---|---|---|
| 5,055,516 | 10/1991 | Fisch et al. | 524/541 |
| 5,157,074 | 10/1992 | Metzger et al. | 524/589 |
| 5,194,487 | 3/1993 | Jacobs | 524/591 |

FOREIGN PATENT DOCUMENTS

| 2081414 | 5/1993 | Canada . |
|---|---|---|
| 2170209 | 8/1996 | Canada . |
| 140323 | 5/1985 | European Pat. Off. . |
| 505875 | 9/1992 | European Pat. Off. . |
| 4219418 | 12/1993 | Germany . |
| 19517185 | 11/1996 | Germany . |
| 19607853 | 9/1997 | Germany . |
| 1584865 | 2/1981 | United Kingdom . |

OTHER PUBLICATIONS

Kunststoffhandbuch, vol. 7, 3rd ed. (month unavailable) 1966, pp. 30 and 31.
D. Dieterich, Agnew. Makromol. Chem. 98 (month unavailable) 1981, 133.
H. Reiff, D. Dieterich, Agnew. Makromol. Chem. 26 (month unavailable) 1972, 85.

*Primary Examiner*—Patrick D. Niland
*Attorney, Agent, or Firm*—Joseph C. Gil; Thomas W. Roy; Diderico van Eyl

[57] ABSTRACT

The present invention relates to aqueous polyurethane dispersions having a resin solids content of 20 to 60 wt %, a viscosity at 23° C. of 10 to 20,000 mPa.s and a pH of 5.5 to 8.5, wherein the polyurethane has a weight average molecular weight of 5,000 to 500,000 and a urethane group content (calculated as —NHCO—O—, molecular weight=59) of 2.5 to 15 wt %, and is based on a polyisocyanate component containing 50 to 100 wt % of 1-methyl-2,4- and/or -2,6-diisocyanatocyclohexane.

The present invention also relates to aqueous binder compositions containing these aqueous polyurethane dispersions and known crosslinking resins and to the use of the aqueous polyurethane dispersions and aqueous binder compositions as binders for glass fiber sizings.

3 Claims, No Drawings

AQUEOUS POLYURETHANE DISPERSIONS BASED ON 1-METHYL-2,4-AND/OR -2,6-DIISOCYANATOCYCLOHEXANE AND THEIR USE AS BINDERS FOR GLASS FIBER SIZINGS

BACKGROUND OF THE INVENTION

1. Field of the Invention

The present invention relates to ionic and/or nonionic aqueous polyurethane dispersions based on 1-methyl-2,4- and/or -2,6-diisocyanatocyclohexane, aqueous binder compositions containing these aqueous polyurethane dispersions and known crosslinking resins and the use of the dispersions and binder compositions as binders for glass fiber sizings.

2. Description of the Prior Art

Polyurethane dispersions are known and described, e.g., in DE-A 1,495,745, 2,645,779, 3,903,538, 4,137,661 and 4,219,418, and in Kunststoffhandbuch Vol. 7, 3rd edition, 1993, pp. 30 and 31. They are also described in D. Dieterich, Angew. Makromol. Chem. 98 (1981) 133 and H. Reiff, D. Dieterich, Angew. Makromol. Chem. 26 (1972) 85. The aqueous polyurethane dispersions described in these prior publications can be used to prepare paints or coatings with excellent properties, which can be used for various applications according to their composition.

It has now been found that aqueous polyurethane dispersions which contain as a main structural component 1-methyl-2,4- and/or -2,6-diisocyanatocyclohexane incorporated through urethane groups and optionally through urea groups possess, in addition to excellent properties, very good viscosity stability during storage when compared to known systems.

It has further been found that when these aqueous polyurethane dispersions are used as binders for glass fiber sizings, the glass-fiber-reinforced plastics have outstanding mechanical properties. Significantly improved processability during manufacture and use of the sized glass fibers was also observed. A further advantage of the sized glass fibers according to the invention is their low bulk volume.

SUMMARY OF THE INVENTION

The present invention relates to aqueous polyurethane dispersions having a resin solids content of 20 to 60 wt %, a viscosity at 23° C. of 10 to 20,000 mPa.s and a pH of 5.5 to 8.5, wherein the polyurethane has a weight average molecular weight of 5,000 to 500,000 and a urethane group content (calculated as —NHCO—O—, molecular weight=59) of 2.5 to 15 wt %, and is the reaction product of a) 50 to 91 wt % of a polyhydroxyl component containing one or more polyhydroxyl compounds having an OH number of 15 to 350, b) 7 to 45 wt % of a polyisocyanate component containing 50 to 100 wt % of 1-methyl-2,4- and/or -2,6-diisocyanatocyclohexane and 0 to 50 wt % of one or more other organic polyisocyanates having molecular weights of 140 to 1500, c) 0 to 12 wt % of a component containing one or more compounds containing anionic or potential anionic groups, with the exception of carboxylate groups, and one or more isocyanate reactive groups, d) 0 to 15 wt % of a nonionic hydrophilic component containing one or more compounds which are mono- to tetrafunctional in isocyanate addition reactions and contain at least one hydrophilic polyether chain and e) 0 to 30 wt % of a component, which is different from components a), c) and d), has a molecular weight of 62 to 2500 and contains isocyanate-reactive groups, wherein the percentages of a) to e) add up to 100, provided that c) and d) cannot both be zero.

The present invention also relates to aqueous binder compositions containing these aqueous polyurethane dispersions and known crosslinking resins and to the use of the aqueous polyurethane dispersions and aqueous binder compositions as binders for glass fiber sizings.

DETAILED DESCRIPTION OF THE INVENTION

The polyurethanes present in the aqueous polyurethane dispersions are reaction products of a) 50 to 91, preferably 65 to 90 and more preferably 68 to 88 wt % of a polyhydroxyl component containing one or more polyhydroxyl compounds having an OH number of 15 to 350, b) 7 to 45, preferably 10 to 30 and more preferably 8 to 23 wt % of a polyisocyanate component containing 50 to 100 wt % of 1-methyl-2,4- and/or -2,6-diisocyanatocyclohexane and 0 to 50 wt % of other organic polyisocyanates having molecular weight of 140 to 1,500, c) 0 to 12, preferably 3 to 9 and more preferably 4 to 8 wt % of a component containing one or more compounds containing anionic or potential anionic groups, with the exception of carboxylate groups, and one or more isocyanate reactive groups, preferably sulphonate and phosphate groups, more preferably sulphonate groups, d) 0 to 15, preferably 0 to 8 wt % of a nonionic-hydrophilic structural component containing one or more compounds which are mono- to tetrafunctional in isocyanate addition reactions and contain at least one hydrophilic polyether chain and e) 0 to 30, preferably 0 to 10 and more preferably 0 to 7.5 wt % of a component, which is different from components a), c) and d), has a molecular weight of 62 to 1200 and contains isocyanate-reactive groups, wherein the percentages of a) to e) add up to 100, provided that c) or d) cannot be zero.

The aqueous binder compositions according to the invention contain

A) an aqueous polyurethane dispersion according to the invention and

B) a hardener component selected from

B1) hydrophobic polyisocyanates having a viscosity at 23° C. of 25 to 5000 mPa.s and an NCO content of 5 to 26 wt %, B2) hydrophilic polyisocyanates containing chemically incorporated hydrophilic polyether chains and having an NCO content of 4 to 24wt %, B3) mixtures of polyisocyanates B1) and B2), B4) blocked polyisocyanates, optionally dispersed in water, prepared by blocking polyisocyanates B1) to B3) with blocking agents for isocyanate groups, B5) amino crosslinking resins and B6) mixtures of crosslinking resins B4) and B5).

The aqueous polyurethane dispersions according to the invention preferably have a solids content of 30 to 60 wt %, a viscosity at 23° C. of 30 to 5000 mPa.s and a pH of 5 to 9. The pH is determined by diluting the aqueous polyurethane dispersions to a solids content of 10%.

The polyurethanes present in the dispersion according to the invention have a weight average molecular weight ($M_w$, which can be determined by gel permeation chromatography using polystyrene as the calibration standard) of 5000 to 500,000, preferably 10,000 to 300,000; an OH number of <20 mg KOH/g resin solids; an acid group content corresponding to an acid value of 7 to 70, preferably 10 to 45 mg KOH/g of resin solids and a degree of neutralization of 20 to 100, preferably 50 to 100%; and a urethane group content (calculated as —NH—CO—O— molecular weight=59) of 2.5 to 15, preferably 5 to 12.5 wt %.

Polyhydroxyl components a) are include the polyester polyols described in Ullmanns Encyklopädie der technischen Chemie, 4th edition, Vol. 19, pp. 62–65. Preferred polyester polyols are those obtained by the reaction of divalent alcohols a3) with divalent carboxylic acids. Instead of the polycarboxylic acids, the polycarboxylic acid anhydrides or the corresponding esters of lower alcohols or their mixtures can also be used to manufacture the polyester polyols. The polycarboxylic acids may be saturated or unsaturated aliphatic, cycloaliphatic or aromatic polycarboxylic acids, which may optionally be substituted by inert substituents.

The reaction to form the polyester polyols takes place by melt or azeotropic condensation at a temperature of 140 to 240° C., optionally in the presence of conventional esterification catalysts. The polycarboxylic acid can be prepared from monocarboxylic acids a1), as well as dicarboxylic acids or polycarboxylic acids a2).

Starting component a1) is a monocarboxylic acid component which consists of at least one monocarboxylic acid having a molecular weight of 112 to 340. Suitable monocarboxylic acids include benzoic acid; tert.-butylbenzoic acid; hexahydro-benzoic acid; saturated fatty acids such as 2-ethylhexanoic acid, isononane acid and coconut oil fatty acid, hydrogenated industrial fatty acids, fatty acid mixtures, decanoic acid, dodecanoic acid, tetradecanoic acid, stearic acid, docasanoic acid (behenic acid) and palmitic acid; unsaturated fatty acids such as soybean oil fatty acid, castor oil fatty acid, sorbic acid, groundnut oil fatty acid, conjugated fatty acid, tall oil fatty acid, sunflower fatty acid and safflower oil fatty acid; and mixtures of these or other monocarboxylic acids.

Starting component a2) is selected from di-, tri- and/or tetracarboxylic acids or their anhydrides having a molecular weight of 98 to 840. Examples include phthalic acid (anhydride), isophthalic acid, terephthalic acid, tetrahydrophthalic acid (anhydride), hexahydrophthalic acid (anhydride), maleic acid (anhydride), succinic acid (anhydride), fumaric acid, adipic acid, sebacic acid, azelaic acid, dimeric fatty acid, trimeric fatty acid, trimellitic acid (anhydride), butanetetra-carboxylic acid and mixtures of these or other acids.

Starting component a3) is selected from diols, triols, tetraols and higher functional alcohols having a molecular weight of 62 to 1200, preferably 62 to 200. Examples include ethylene glycol, 1,2- and 1,3-propylene glycol, 1,3-, 1,4- and 2,3-butanediol, 1,6-hexanediol, trimethylhexanediol, diethylene glycol, triethylene glycol, hydrogenated bisphenols, 1,4-cyclohexanediol, 1,4-cyclohexanedimethanol, neopentyl glycol, tricyclodecanediol, trimethylolpropane, glycerol, pentaerythritol, trimethyl-pentanediol, dipentaerythritol, ditrimethylolpropane, castor oil and mixtures of these or other polyvalent alcohols.

Polycarbonate diols are also suitable such as those obtained by reacting phosgene with an excess of low molecular weight alcohols a3).

Lactone-based polyester diols are also suitable such as homo- or copolymers of lactones, preferably addition products of lactones to difunctional starter molecules. Examples of lactones include ε-caprolactam, β-propiolactone, γ-butyrolactone, methyl-ε-caprolactone and mixtures thereof. Suitable starter components include the low molecular-weight, divalent alcohols mentioned under a3). The corresponding polymers of ε-caprolactone are particularly preferred. Low molecular weight polyester diols or polyether diols can also be used as starters for the manufacture of the lactone polymers. Instead of polymers of lactones, the corresponding hydroxycarboxylic acids can also be used.

Polyether polyols may also be used as polyhydroxyl compounds a). They can be obtained by the polymerization of ethylene oxide, propylene oxide, butylene oxide, tetrahydrofuran, styrene oxide or epichlorohydrin with each other, e.g. in the presence of $BF_3$ or basic catalysts, or by the addition of these compounds, either as a mixture or sequentially, to starter components containing reactive hydrogen atoms such as alcohols or amines, e.g. water, ethylene glycol, propane-1,3-diol, 1,2-bis-(4-hydroxydiphenyl)-propane, glycerol, trimethylolpropane, pentaerythritol or aniline.

The polyester diols and polyether diols may also be used as mixtures in a weight ratio of 9:1 to 1:9. The hardness and the modulus of elasticity of the polyurethanes can be increased if low molecular weight diols having a molecular weight of 50 to 500, preferably of 60 to 200 are also used. Suitable alkane diols are those described as suitable for preparing the polyester polyols, preferably unbranched diols having 2 to 12 carbon atoms, more preferably those having an even number of carbon atoms.

Component b) is selected from organic polyisocyanates having a weight average molecular weight of 140 to 1500, preferably 168 to 318, provided that 50 to 100, preferably 75 to 100 and more preferably 100 wt % of component b) is made up of 1-methyl-2,4-diisocyanatocyclohexane and/or 1-methyl-2,6-diisocyanatocyclohexane.

This diisocyanate or diisocyanate mixture is preferably the 2,4-isomer or a mixture thereof with up to 35 wt %, based on the weight of the mixture, of the 2,6-isomer. These diisocyanates are known and may be manufactured by the gas-phase phosgenation described in DE-A-4,412,327.2.

In addition to the previously described diisocyanates essential to the invention, component b) can also contain other polyisocyanates such as hexamethylene diisocyanate (HDI), 1-isocyanato-3,3,5-trimethyl-5-isocyanatomethyl-cyclohexane (IPDI), 2,4- and/or 2,6-diisocyanatotoluene (TDI), 4,4'-diisocyanatodicyclohexylmethane ($H_{12}$MDI) and 4,4'-diiso-cyanatodiphenylmethane (MDI), 1,4-butylene diisocyanate (BDI), the isomeric xylylene diisocyanates (XDI) and their hydrogenated products ($H_6$-XDI).

Polyisocyanate component b) can also contain lacquer polyisocyanates prepared from the preceding diisocyanates, preferably HDI, IPDI and/or TDI, and containing biuret, isocyanurate, urethane and/or allophonates groups.

Component c) is selected from compounds containing anionic or potential anionic groups and one or more isocyanate-reactive groups. Carboxylate groups are excluded! These compounds are preferably sulphonic acids and phosphoric acids containing at least one, preferably one or two hydroxyl or amino groups, or the corresponding salts of these amino or hydroxy acids. The use of sulphonate diols optionally containing ether groups, such as those described in U.S. Pat. No. 4,108,814, as anionic structural component c) is preferred. The free acid groups, in particular sulphonic acid groups, represent "potential anionic" groups, while salt groups obtained by neutralizing the potential anionic groups with bases represent "anionic groups."

Component d) is selected from nonionic-hydrophilic compounds containing one to four, preferably one or two isocyanate-reactive groups, preferably hydroxyl or amino groups. The polyether chains present in these compounds contain at least 80 wt %, preferably 100 wt %, of ethylene oxide units. Other alkylene oxides include propylene oxide. Suitable nonionic-hydrophilic structural components include polyethylene glycols having weight average molecular weights of 300 to 6000 (e.g. Carbowax 300, 400, 1000, 1500, 2000 and 6000, available from Union Carbide); monofunctional polyethylene glycol monoalkyl-ethers having weight average molecular weights of 350 to 5000 (e.g. Breox 350, 550 and 750, available from BP Chemicals and Polyether LB 25, LB 30 and LB 40, available from Bayer AG); difunctional polyether amines (e.g. Jeffamine ED 600, ED 900 and ED 4000, available from Texaco Chemical Company); and mono-functional polyether amines (e.g. Jeffamine M 715, M 1000 and M 2070, available from Texaco).

Component e) is selected from other mono-, di- and/or trifunctional compounds having a weight average molecular weight of 62 to 2500, preferably 62, to 1200, containing hydroxyl and/or amino groups such as ethylene glycol, propylene glycol, trimethylol propane, ethanolamine, diethanolamine, diethylenetriamine, cyclohexanol, dodecanol and monofunctional, unsaturated alcohols (e.g., Ocenol, available from Henkel). Higher molecular weight polyols, which are outside the scope of components a), c) or d), such as polycarbonate diols, are included within the scope of component e).

The manufacture of the polyurethanes according to the invention takes place either in the absence of solvent or as 40 to 99 wt % organic solution, wherein components a), c), d) and e), optionally dissolved in solvent, are introduced and reacted with component b) at temperatures of 40 to 140° C. in such a way that free OH or NH groups are for practical purposes no longer detectable after the reaction. Preferably, the components are used in amounts sufficient to provide an equivalent ratio of isocyanate groups to isocyanate-reactive groups of 3:1 to 0.9:1. The free acid groups of component c) are not included in the calculation of this equivalent ratio.

The reaction optionally takes place in the presence of 0.01 to 1 wt %, based on the weight of the reaction mixture, of suitable catalysts. If compounds containing salt groups are not used as component c), then at least partial neutralization of the chemically incorporated acid groups takes place during the reaction or before, during and/or after dispersing or dissolving the polyurethane in water by the addition of a base. Preferably 20 to 100 %, more preferably 50 to 100%, of the chemically incorporated acid groups, in particular carboxyl groups and sulphonic acid groups, are neutralized. Any optionally used solvent can partly or completely removed before, during or after the dispersion or dissolution step, by distillation, optionally azeotropically and/or under vacuum, and/or with the use of an inert gas current.

Suitable solvents include N-methylpyrrolidone, diethylene glycol dimethylether, methyl ethyl ketone, methyl isobutyl ketone, acetone, toluene, xylene, butyl acetate, methoxypropyl acetate and mixtures of these or other solvents that do not react with isocyanate groups.

Suitable catalysts for the urethane formation reaction include tertiary amines such as triethylamine; tin compounds such as tin-II-octoate, dibutyltin oxide and dibutyltin dilaurate; and other commonly used catalysts.

Suitable bases include ammonia, N-methylmorpholine, dimethylisopropanolamine, triethylamine, dimethylethanolamine, methyldiethanolamine, tri ethanolamine, morpholine, tripropylamine, ethanolamine, triisopropanolamine, 2-diethylamino-2-methyl-1-propanol and mixtures of these and other neutralizing agents. Also suitable, but less preferred as neutralizing agents, are sodium hydroxide, lithium hydroxide and potassium hydroxide.

Ammonia and dimethylethanolamine are preferred as neutralizing agents.

After the urethanizing reaction small amounts of other organic solvents may be added to obtain particular properties. These solvents include ethanol, propanol, butanol, butyl glycol, hexanol, octanol, butyl diglycol, ethyl diglycol, methyl diglycol and methoxypropanol.

The dispersion step may be carried in accordance with several embodiments, e.g., the water/neutralizing agent mixture may be added to the resin; the water may be added to the resin/neutralizing agent mixture, the resin may be added to the water/neutralizing agent mixture or the resin/neutralizing agent mixture may be added to the water. The dispersibility of the resins in water can optionally be improved by the additional use of external emulsifiers, such as ethoxylated nonylphenol. The dispersion step is preferably carried out at 40 to 120° C.

In the binder compositions according to the invention the aqueous polyurethane dispersions are present in combination with crosslinking resins B) as previously discussed.

Hydrophobic polyisocyanates B 1) that are suitable as crosslinking resins are selected from organic polyisocyanates which have an NCO content of 5 to 26%, contain aliphatically, cycloaliphatically, araliphatically and/or aromatically bound isocyanate groups, and are liquid at room temperature. Polyisocyanate component B1) preferably has a viscosity of 50 to 5000 mPa.s at 23° C. The polyisocyanate component is preferably selected from polyisocyanates or polyisocyanate mixtures, which exclusively contain aliphatically and/or cycloaliphatically bound isocyanate groups and have an average NCO functionality of between 1.8 and 5.0 and a preferred viscosity at 23° C. of 50 to 3000 mPa.s.

If necessary, the polyisocyanates can be used in admixture with small amounts of inert solvents to reduce the viscosity to a value within the disclosed ranges. However, the amount of these solvents should be limited such that the resulting coating compositions do not contain more than 20 wt % of solvent, based on the weight of the binder.

Suitable solvents for the polyisocyanates include aromatic hydrocarbons such as "solvent naphtha" and the previously described solvents.

Preferred hydrophobic polyisocyanates B1) are the "lacquer polyisocyanates" prepared from hexamethylene diisocyanate (HDI), 1-isocyanato-3,3,5-trimethyl-5-isocyanatomethyl-cyclohexane (IPDI) and/or bis (isocyanatocyclohexyl)methane, in particular those based exclusively on HDI. "Lacquer polyisocyanates" are understood to mean the known derivatives of these diisocyanates that contain biuret, urethane, uretdione, allophonate and/or isocyanurate groups, which after their manufacture have been freed in known manner, preferably by distillation, of excess starting diisocyanate down to a residual content of less than 0.5 wt %. The preferred aliphatic polyisocyanates to be used according to the invention include polyisocyanates which are prepared from HDI and contain biuret groups, such as those described in U.S. Pat. Nos. 3,124,605, 3,358, 010, 3,903,126, 3,903,127 and 3,976,622. These polyisocyanates contain mixtures of N,N',N"-tris-(6-isocyanatohexyl)-biuret with lesser amounts of its higher homolog. Other preferred aliphatic polyisocyanates are the cyclic trimers of HDI, such as those described in U.S. Pat. No. 4,324,879, which contain N,N',N"-tris-(6-isocyanatohexyl)-isocyanurate in admixture with lesser amounts of its higher homologs.

Particularly preferred aliphatic polyisocyanates are polyisocyanates prepared from HDI and containing uretdione, allophonate and/or isocyanurate groups, which may be obtained by the catalytic oligomerization of hexamethylene diisocyanate with the use of trialkylphosphines. Particularly preferred are those having a viscosity at 23° C. of 50 to 500 mPa.s and an NCO functionality of 2.2 to 5.0.

Suitable aromatic polyisocyanates that may be used as hydrophobic polyisocyanate Ba) are lacquer polyisocyanates prepared from 2,4-diisocyanatotoluene or mixtures thereof with 2,6-diisocyanato-toluene or prepared from 4,4'-diisocyanato-diphenylmethane or mixtures thereof with its isomers and/or higher homologs. These aromatic lacquer polyisocyanates include polyisocyanates containing urethane groups, which may be obtained by reacting excess amounts of 2,4-diisocyanatotoluene with polyvalent alcohols such as trimethylol propane and subsequently removing unreacted excess diisocyanate by distillation. Other aromatic lacquer polyisocyanates include trimers of the previously described monomeric diisocyanates, which have been freed from excess, monomeric diisocyanates, preferably by distillation.

The use of unmodified polyisocyanates is also possible, provided that they satisfy the viscosity requirements. This polyisocyanate component can also contain mixtures of the polyisocyanates mentioned as examples.

Polyisocyanate component B2) is selected from hydrophilically modified polyisocyanates, which include the previously described lacquer polyisocyanates, in particular HDI-based lacquer polyisocyanates containing isocyanurate groups, which have been rendered hydrophilic by a reaction with monovalent, hydrophilic polyether alcohols. These hydrophilic polyisocyanates preferably have an NCO content of 4 to 24 wt % and an ethylene oxide content of 4 to 30 wt % arranged within polyether chains having 6 to 60 chain members. The manufacture of these hydrophilic lacquer polyisocyanates, whose hydrophilic polyether chains are almost exclusively based on ethylene oxide units, is described, e.g, in U.S. Pat. No. 4,663,337 or in EP-A-540, 985.

Crosslinking component B3) is selected from mixtures of polyisocyanates B1) and B2). In these mixtures the weight ratio of B1):B2) is preferably 0.2:1 to 5:1. "Mixtures" are understood to mean mixtures of non-hydrophilically-modified polyisocyanates B1) with separately manufactured hydrophilic polyisocyanates B2). The term "mixture" does not refer to the fact that during the preparation of hydrophilic polyisocyanates B2) only a portion of the polyisocyanates are hydrophilically modified, such that component B2) itself represents a "mixture" of hydrophobic and hydrophilic polyisocyanates.

Crosslinking component B4) is selected from blocked polyisocyanates prepared by blocking the isocyanate groups of polyisocyanates B1) to B3) with reversible, monofunctional blocking agents for isocyanate groups. Suitable blocking agents include monovalent alcohols such as methanol, ethanol, n-butanol, cyclohexanol and benzyl alcohol; oximes such as acetone oxime and methylethyl ketoxime; lactams such as $\epsilon$-caprolactam; H-active compounds such as diethyl malonate or ethyl acetoacetate; phenols and heterocyclic blocking agents.

Crosslinking resins B5) are selected from water-dilutable or water-dispersible melamine- or urea-formaldehyde condensation products, such as those described in D. H. Solomon, The Chemistry of Organic Filmformers, p. 235 et seq., John Wiley & Sons, Inc., New York, 1967. The melamine resins can be replaced in whole or in part by other aminoplast resins, such as those described in "Methoden der organischen Chemie" (Houben-Weyl), Vol. 14/2, Part 2, 4th edition, Georg Thieme Verlag, Stuttgart 1963, p. 319 et seq..

Crosslinking component B6) is selected from mixtures of blocked polyisocyanates B4) with melamine resins B5). Such mixtures are preferably used a weight ratio of B4):B5) of 0.2:1 to 5:1.

Polyisocyanates B1), B2) and B3), which containing free isocyanate groups, are preferably used in the binder compositions according to the invention. A hydrophilic modification of the polyisocyanates is not always necessary because the dissolved or dispersed polyurethane resin can also simultaneously function as an emulsifier for the polyisocyanate. This function can also be supported by the additional use of external emulsifiers.

Preferably, crosslinkers B) exclusively contain polyisocyanates B1) and/or B2) containing free isocyanate groups. In this case, and also in the particularly preferred case of blocked polyisocyanates B4), the amounts of components A) and B) are selected to provide an NCO/OH equivalent ratio, based on the (optionally blocked) isocyanate groups of component B) and the alcoholic hydroxyl groups of component A), of 0.5:1 to 5:1, preferably 0.8:1 to 2:1. The manufacture of the ready-to-use binder compositions takes place by simple mixing of components A) and B) at room temperature, optionally with the use of suitable mixing or dispersing units.

During the manufacture of the aqueous binder compositions the auxiliary solvents are used in such amounts, or after the manufacture of aqueous polyurethane dispersions A) are removed by distillation to such an extent, that the resulting binder compositions do not contain more than 20 wt %, preferably not more than 10 wt %, of organic solvents.

It is possible before, during or after the manufacture of the aqueous binder compositions by the mixing of the individual components A) and B), and also during the manufacture of one-pack binders, to add known additives, such as defoaming agents, thickening agents, flow control agents, dispersing aids, catalysts, anti-skinning agents, anti-settling agents, emulsifiers and biocides.

The sizing agents for glass fibers according to the invention contain as binders the polyurethanes according to the invention in the form of aqueous solutions or aqueous dispersions and may also contain emulsifiers, other film-forming resins, coupling agents, lubricants and other additives such as wetting agents or antistatics. The coupling agents, lubricants and additives, the method of manufacture, the method of sizing and the finishing of the glass fibers is known and described for example in K. L. Loewenstein "The Manufacturing Technology of Continuous Glass Fibers", Elsevier Scientific Publishing Corp., Amsterdam, London, New York, 1983.

The other film forming resins that may be used in combination with the aqueous polyurethane dispersions according to the invention are polymers, which are dispersible, emulsifiable or soluble in water. Examples include polyester polymers or polyester polymers containing epoxy groups, polyurethanes, acrylic polymers, vinyl polymers such as polyvinyl acetate, mixtures of such polymers and copolymers of corresponding monomers. The concentration of the film forming resins in the sizing agents according to the invention is preferably 1 to 12 wt %, more preferably 2 to 8 wt %. The proportion of the polyurethanes according to the invention, based on the total weight of film-forming resins, is preferably 10 to 100 wt %, more preferably 50 to 100 wt %.

Suitable coupling agents include the known silane coupling agents, for example 3-aminopropyltrimethoxy- or triethoxysilane, N-(2-aminoethyl)-3-aminopropyltrimethoxysilane, 3-glycidylpropyltrimethoxysilane, vinyltrimethoxysilane, vinyltriethoxysilane and 3-methacryloxy-propyltriethoxysilane. The silane coupling agents are present in the sizing agents according to the invention in an amount of preferably 0.05 to 2 wt %, more preferably 0.15 to 0.85 wt %, based on the total weight of the sizing agent.

The sizing agents according to the invention may contain one or more nonionic and/or ionic lubricants, such as polyalkylene glycerol ethers of fatty alcohols or fatty amines, polyalkylene glycol ethers and glycerol esters of fatty acids having 12 to 18 carbon atoms, polyalkylene glycols, higher fatty acid amides having 12 to 18 carbon atoms of polyalkylene glycols and/or alkenyl amines, quaternary nitrogen compounds such as ethoxylated imidazolinium salts, mineral oils, and waxes. The lubricant or lubricants are preferably used in an overall concentration of 0.05 to 1.5 wt %, based on the total weight of the sizing agent.

In addition the sizing agents according to the invention may contain one or more antistatics, such as lithium chloride, ammonium chloride, Cr-Ill salts, organic titanium compounds, arylalkyl sulphates or sulphonates, arylpolyglycol ether sulphonates and quaternary nitrogen compounds. The antistatics are preferably used in concentrations of 0.01 to 0.8 wt %, based on the total weight of the sizing agent.

The manufacture of the glass fiber sizings according to the invention is not difficult. About half of the total water required is introduced into a suitable mixing vessel and then the polyurethane dispersion according to the invention, the lubricant and optionally other additives are added successively with stirring. Thereafter, the pH is set at 5 to 7 and then hydrolyzate, prepared according to the instructions of the manufacturer (UCC, New York), of a trialkoxysilane is added. The size is ready to use after a further stirring time of 15 minutes; the pH is optionally adjusted once again to 5 to 7.

Suitable sized glass fibers include both the known glass types used for the manufacture of glass fiber, such as low-alkali, high-alkali, C- and S-glass, and also other known products of glass fiber manufacturers. Among the glass types mentioned for the manufacture of continuous glass fibers, the low-alkali glass fibers are the most important for the reinforcement of plastics material because of their low-alkali content, high tensile strength and high modulus of elasticity.

The sizing agents can be applied by various methods, for example, with the aid of suitable appliances such as spray or roller applicators. They are applied to the glass filaments drawn at high speed out of spinnerets immediately after the latter have set, i.e. prior to wind-up. It is also possible, however, to size the fibers in a dip coating bath after the spinning process. The sized glass fibers can be processed for example into chopped strands either wet or dry. Drying of the final or intermediate product takes place at temperatures of 90 to 150° C.. By drying is to be understood not only the removal of other volatile components, but also the solidification of the size ingredients. The size has converted into the finished coating only on completion of the drying. The amount of the sizing agent, based on the weight of the sized glass fibers, is preferably 0.1 to 2 wt %, more preferably 0.3 to 1.0 wt %.

A large number of thermoplastics or thermosetting polymers can be used as matrix polymers. Example of thermoplastic polymers include polyolefins such as polyethylene or polypropylene; polyvinyl chloride; polymers such as styrene/acrylonitrile copolymers, ABS, polymethylmethacrylate or polyoxymethylene; aromatic and/or aliphatic polyamides such as polyamide-6 or polyamide-6,6; polycondensates such as polycarbonate, polyethylene terephthalate, liquid crystalline polyaryl esters, polyarylene oxide, polysulphone, polyarylene sulphide, polyaryl sulphone, polyether sulphone, polyaryl ether or polyether ketone; and polyadducts such as polyurethanes. Examples of thermosetting polymers include epoxy resins, unsaturated polyester resins, phenolic resins, amino resins, polyurethane resins, polyisocyanurates, epoxy/isocyanurate combination resins, furan resins, cyanurate resins and bismaleinimide resins.

The sizing agents according to the invention are also suitable for all applications in which solvent-containing, solvent-free or other kinds of aqueous paint and coating systems with an enhanced property profile are used. Examples include the coating of practically all mineral building material surfaces (such as lime- and/or cement-bonded plasters, surfaces containing gypsum, fibrated concrete building materials and concrete), chipboard and paper; painting and sealing of wood and wood-based materials such as particle boards, wood fiber ceiling boards and paper; painting and coating of metallic surfaces; coating of bituminous road surfaces; and painting and sealing of various plastics material surfaces. The paints or coating compositions manufactured with the binder compositions according to the invention are extremely varied in nature, such as primers, fillers, pigmented or transparent top coats e.g., in the industrial painting, automotive original equipment manufacture (OEM) and refinish sectors.

The coating compositions can be applied by a wide range of spraying methods, such as air pressure, airless or electrostatic spraying methods with the use of one- or optionally two-component spray equipment. The paints and coating compositions can also be applied by brushing, roller application or knife coating.

EXAMPLES

In the following examples all percentages refer to percentages by weight, unless stated otherwise. All the examples were carried out under inert gas (nitrogen). All figures relating to the hydroxyl and acid numbers refer to mg KOH/g of resin solids.

Example 1

Manufacture of an anionic aqueous polyurethane dispersion containing sulphonate groups and polyoxyethylene oxide Prepolymer batch amounts:

| | | |
|---|---|---|
| 2352.0 g | (1.3835 mol) | 1,6-hexanediol-neopentylglycol-polyadipate (MW 1700, molar ratio of diols 0.65:0.35) |
| 89.3 g | (0.0400 mol) | n-butanol-initiated polyoxyethylene-polyoxypropylene polyether (MW 2250, EO:PO ratio 83:17) |
| 262.5 g | (1.5625 mol) | hexamethylene diisocyanate |
| 296.2 g | (1.5625 mol) | 1-methyl-2,4- and -2,6-diisocyanatocyclohexane (80/20 isomer mixture) |
| 5690 ml | | acetone |

Extension batch amounts: (calculated on 4.7% NCO)
Solution of

| | | |
|---|---|---|
| 160.0 g | (0.9410 mol) | isophorone diamine |
| 15.7 g | (0.3137 mol) | hydrazine hydrate |
| 63.5 g | (0.1620 mol) | of a 50% aqueous solution of the sodium salt of 2-aminoethyl-β-aminoethanesulphonic acid in 478 ml of demineralized water |
| 4093 ml | | of demineralized water |

Procedure

The de-watered polyols were introduced and mixed with the isocyanate mixture with stirring at room temperature. The reaction mixture was heated to 100° C. It was held at 100 C.–105° C. for 1¼ hours and the NCO content was then determined.

Target value: 4.4±0.3%.

The prepolymer was dissolved to form a 40% solution in acetone after reaching of the NCO content.

After cooling to 40° C., the solution was mixed with the extender solution with vigorous stirring and stirred once again for 15 minutes. Dispersion with water then takes place within approx. 3 minutes.

After the distilling off of the acetone, a finely-distributed, homogeneous dispersion was obtained, which was then filtered and decanted.

Data

NCO/OH equivalent ratio: 2.23:1
% NCO (calculated): 4.8
% NCO (found): 4.7
% extension: 85
% Ethylene oxide (EOx): 2.3
% resin solids: 40
% sulphonate: 0.4
pH value: 6.1

Example 2: (Comparative Example)

The procedure was exactly the same as Example 1, except that an equimolar mixture of hexamethylene diisocyanate and isophorone diisocyanate was used as polyisocyanate mixture.

Data

NCO/OH equivalent ratio: 2.22:1
% NCO (calculated): 4.8
% NCO (found): 4.7
% extension: 85
% Eox: 2.3
% resin solids: 40
% sulphonate: 0.4
pH value: 6.1

Example 4

Manufacture of a nonionic aqueous polyurethane dispersion containing polyoxyethylene oxide Prepolymer batch amounts:

| | | |
|---|---|---|
| 2241.0 g | (0.2668 mol) | hexanediol-polyadipate (MW 840) |
| 71.4 g | (0.0320 mol) | n-butanol-initiated polyoxyethylene-polyoxypropylene polyether (MW 2250) |
| 8.3 g | (0.1334 mol) | ethylene glycol |
| 87.9 g | (0.4638 mol) | 1-methyl-2,4- and 2,6-diisocyanatocyclohexane (80/20 isomer mixture) |
| 1 drop | | tin octoate |
| 759 ml | | acetone |
| 11.0 g | (0.1058 mol) | diethanolamine |
| 767 ml | | demineralized water |

Procedure

The de-watered polyols were introduced and mixed with the isocyanate with stirring at 45° C. The reaction mixture was heated to 100° C. It was held at 100° C.–105° C. for 3 hours (catalysis was carried out after 2 hours) and the NCO content was then determined.

Target value: 1.0±0.1%.

The prepolymer was dissolved to form a 40% solution in acetone after the reaching of the NCO content.

After cooling to 30° C., the solution was mixed with the diethanolamine with vigorous stirring and stirred once again for 10 minutes. Dispersion with water then takes place within approx. 3 minutes.

After distilling off the acetone, a finely-distributed, homogeneous dispersion was obtained, which was then filtered and decanted.

Data

NCO/OH equivalent ratio: 1.11:1
% NCO (calculated): 1.02
% NCO (found): 1.05 diethanolamine based on NCO content found: 100 mol. %
% Eox: 14.9
% moisture: 35
pH value: 8
OH-group content: 0.9%

Example 5

Manufacture of an anionic aqueous polyurethane dispersion containing sulphonate groups and polyoxyethylene oxide 244.8 parts of a polyester prepared from adipic acid, 1,6-hexane-diol and neopentyl glycol (molar ratio of diols 0.65:0.35) and having an OH number 66 were mixed with 18.0 parts of a monofunctional polyether alcohol having an OH number of 26 (manufactured by alkoxylation of n-butanol with the use of a mixture of 83% ethylene oxide and 17% propylene oxide) and 25.8 parts of a sulfonate diol (propoxylated adduct of 2-butanediol-1,4 and $NaHSO_3$, MW 430) and blended at 50° C. with 35.8 parts of a mixture of 80% 1-methyl-2,4-diisocyanatocyclohexane and 20% 1-methyl-2,6-diisocyanatocyclohexane ("$H_6TDI$") and 33.6 parts of 1,6-diisocyanatohexane (HDI) and reacted at 75° C. until the NCO content of the resulting prepolymer had fallen to 4.2%.

The mixture was cooled to 70° C. and mixed with 33.4 parts of a bis-ketimine manufactured from methylisobutyl ketone and 3-aminomethyl-3,5,5-trimethylcyclohexylamine (isophorone diamine).

A mixture of 605.9 parts of demineralized water preheated to 50° C. and 1.5 parts of hydrazine hydrate was then added with vigorous stirring and stirred again for 3 hours at 70° C. The bluish dispersion obtained had a solids content of 39% and a viscosity of 100 mPa.s (23° C).

Example 6

Manufacture of an anionic aqueous polyurethane dispersion containing sulphonate groups and polyoxyethylene oxide.

246.5 parts of a polyester prepared from adipic acid, 1,6-hexane-diol and neopentyl glycol (molar ratio of diols 0.65:0.35) and having an OH number 66 were mixed with 17.1 parts of a monofunctional polyether alcohol having an OH number of 26 (manufactured by alkoxylation of n-butanol with the use of a mixture of 83% ethylene oxide and 17% propylene oxide) and 32.3 parts of a sulfonate diol (propoxylated adduct of 2-butanediol-1,4 and $NaHSO_3$, MW 430) and blended at 50° C. with 51.9 parts of a mixture of 80% 1-methyl-2,4-diisocyanatocyclohexane and 20% 1-methyl-2,6-diisocyanatocyclohexane ("$H_6TDI$") and 21.0 parts of 1,6-diisocyanatohexane (HDI) and reacted at 75° C. until the NCO content of the resulting prepolymer has fallen to 4.2%.

The mixture was then dispersed by adding the 80° C. hot prepolymer with vigorous stirring to 500 parts of demineralized water which had a temperature of 50° C. A mixture of 1.8 parts of hydrazine hydrate, 12.9 parts of 2-methyl-pentamethylene-diamine and 89.7 parts of demineralized water was added dropwise and the mixture was stirred for 2 hours at 70° C. The resulting bluish dispersion had a solids content of 40% and a viscosity of 60 mPa.s (23° C.).

The table also provides information on the improvements in properties for glass fibers sized according to the invention when compared to those of Comparison Example 2.

Examples 1,4,5 and 6 are according to the invention. They show equal or better flexural strength and impact strength with lower size coating (0.50–0.54% as compared to 0.60%). This is unexpected, since normally the higher the size, coating %, the higher are the flexural and impact strength.

Test results
PUR dispersions/glass fibers/GF-reinforced plastics material

| Product | Solids (%) | PS [nm] | PSD DV (0.9)* [μM] | Size Coating (%) | Bulk Volume [l/kg] | Tensile strength[1] [MPa] | Flexural strength[2] [MPa] | Impact strength[3] [KJ/m²] |
|---|---|---|---|---|---|---|---|---|
| Example 1 according to the invention | 40 | 207 | 0.51 | 0.53 | 1.95 | 185 | 283 | 66.1 |
| Example 2 (Comp.) | 40 | 228 | 0.54 | 0.60 | 1.87 | 180 | 272 | 64.3 |
| Example 4 according to the invention | 35 | 208 | 0.76 | 0.51 | 1.90 | 189 | 287 | 67.0 |
| Example 5 according to the invention | 39 | 111 | 0.49 | 0.50 | 1.65 | 182 | 273 | 58.1 |
| Example 6 according to the invention | 40 | 173 | 0.51 | 0.54 | 1.75 | 181 | 274 | 59.0 |

*A DV-0.9 value of 10 μm means that 90% of all particles by volume were smaller than 10 μm. The numerical value therefore provides information on the accumulated size by volume distribution. cf. Handbuch Mastersizer E, Fa. Malvern, D-71083 Herrenberg, Germany.
[1] according to DIN 53 455
[2] according to DIN 53 457
[3] according to DIN ISO 180

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The manufacture of the glass fiber sizings according to the invention

About half of the total amount of water required was introduced into a suitable mixing vessel (47 kg) and then 5 kg of the polyurethane dispersion according to the invention, 0.5 kg of a lubricant (Breox 50-A140, available from BP Chemicals) and optionally other additives were added successively with stirring. The pH value was adjusted to 5 to 7 and then a hydrolyzate (0.5 kg of 3-amino-propyl-triethoxysilane in 47 kg of water, manufactured according to the instructions of the manufacturer, UCC, New York) was added.

After a further stirring time of 15 minutes the sizing agent was ready to use; if necessary the pH value was adjusted once again to 5 to 7.

Glass fibers having a diameter of 9–11 μm were manufactured using a his- and roll-applicator chopped and dried with the previously described sizing agents. This is known in the art and described in numerous patents, one of them is DBP-2 553 839.

Standard test specimens were manufactured from 70 parts of polyamide 6 (BKV, Bayer AG) and 30 parts of these chopped strands (chopped strands having a length of 4.5 mm) in an extruder at 250° C. and the mechanical data was measured.

The following table contains data on the mean particle size, the particle size distribution (PSD, given here as so-called DV-0.9 values) of sized glass fibers, the amount of sizing agent used, the bulk volume of the glass fibers, and the measured values for tensile strength, flexural strength and impact strength.

What is claimed is:

1. An aqueous polyurethane dispersion having a resin solids content of 20 to 60 wt %, a viscosity at 23° C. of 10 to 20,000 mPa.s and a pH of 5.5 to 8.5, wherein the polyurethane has a weight average molecular weight of 5,000 to 500,000 and a urethane group content (calculated as —NHCO—O—, molecular weight=59) of 2.5 to 15 wt %, and is the reaction product of
   a) 50 to 91 wt % of a polyhydroxyl component containing one or more polyhydroxyl compounds having an OH number of 15 to 350,
   b) 7 to 45 wt % of a polyisocyanate component containing 50 to 100 wt % of 1-methyl-2,4- and/or -2,6-diisocyanatocyclohexane and 0 to 50 wt % of one or more other organic polyisocyanates having molecular weights of 140 to 1500,
   c) 0 to 12 wt % of a component containing one or more compounds containing anionic or potential anionic groups, with the exception of carboxylate groups, and one or more isocyanate reactive groups,
   d) 0 to 15 wt % of a nonionic hydrophilic component containing one or more compounds which are mono- to tetrafunctional in isocyanate addition reactions and contain at least one hydrophilic polyether chain and
   e) 0 to 30 wt % of a component, which is different from components a), c) and d), has a molecular weight of 62 to 2500 and contains isocyanate-reactive groups,
   wherein the percentages of a) to e) add up to 100, provided that c) or d) cannot be zero.

2. The aqueous polyurethane dispersion of claim 1 wherein the polyurethane is the reaction product of 65 to 90 wt % of polyhydroxyl component a), 10 to 30 wt % of polyisocyanate component b), 0 to 8 wt % of component c), 0 to 15 wt % of nonionic hydrophilic component d) and 0 to 30 wt % of component e), which has a molecular weight of 62 to 1200.

3. An aqueous binder composition comprising
   A) the aqueous polyurethane dispersion of claim 1 and
   B) a hardener component comprising a member selected from the group consisting of
      B1) hydrophobic polyisocyanates having a viscosity at 23° C. of 25 to 5000 mPa.s and an NCO content of 5 to 26 wt %,
      B2) hydrophilic polyisocyanates containing chemically incorporated hydrophilic polyether chains and having an NCO content of 4 to 24 wt %,
      B3) mixtures of polyisocyanates B1) and B2),
      B4) blocked polyisocyanates, optionally dispersed in water, prepared by blocking polyisocyanates B1) to B3) with blocking agents for isocyanate groups,
      B5) amino crosslinking resins and
      B6) mixtures of crosslinking resins B4) and B5).

* * * * *